(No Model.)

F. X. HOOPER & W. HOLLINGSWORTH.
BEARING AND SUPPORTING DEVICE.

No. 462,436. Patented Nov. 3, 1891.

Witnesses

F. X. Hooper
Wm Hollingsworth
Inventors

By their Attorneys
Davis & Co

United States Patent Office.

FRANCIS X. HOOPER AND WILLIAM HOLLINGSWORTH, OF BALTIMORE, MARYLAND; SAID HOLLINGSWORTH ASSIGNOR TO SAID HOOPER.

BEARING AND SUPPORTING DEVICE.

SPECIFICATION forming part of Letters Patent No. 462,436, dated November 3, 1891.

Application filed April 7, 1891. Serial No. 387,963. (No model.)

*To all whom it may concern:*

Be it known that we, FRANCIS X. HOOPER and WILLIAM HOLLINGSWORTH, citizens of the United States, residing at Baltimore, in the State of Maryland, have invented a certain new, useful, and valuable Improvement in Bearings and Supporting Devices, of which the following is a full, clear, and exact description.

Our invention relates to or consists of improved mechanism for supporting the journals of the impression-cylinder of a printing-press, to take up the wear of said journals, and cause the cylinder to always revolve smoothly and evenly, and thus print the paper properly.

Figure 1:
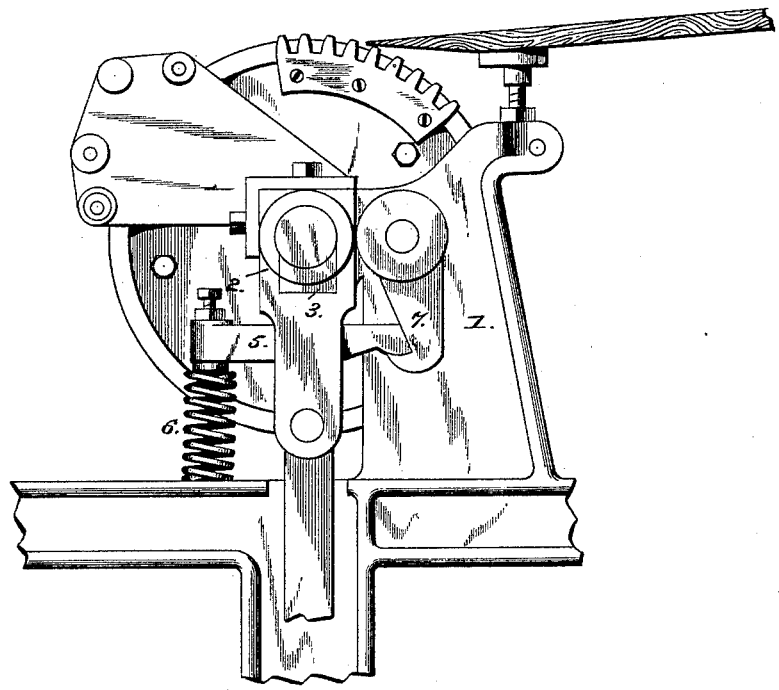
Figure 2:
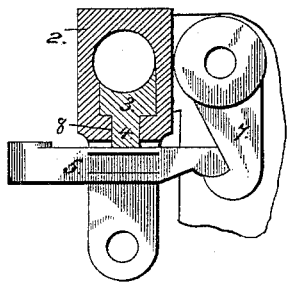
Figure 3:
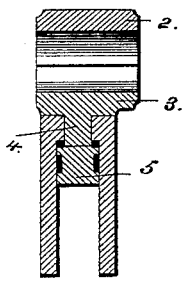

Referring to the accompanying drawings, Figure 1 is a side elevation of our improved bearing, together with a portion of a cylinder printing-press. Fig. 2 is a detail view, partly in section, of our bearing. Fig. 3 is a detail cross-sectional view of the bearing.

Our invention is described as follows: It consists of the plate 1, having the integral or rigid bearing 2 and a movable bearing 3, formed with a lug 4, passing through an opening 8 in the lower part of the rigid bearing and resting upon an arm 5, one end of which rests on a coil-spring 6, which spring rests on the frame of the press. The inner end of said arm 5 is formed with a nib, which rests in the hook or link 7, having its upper end pivoted to the side of plate 1. The opposite end of the frame is provided with a similar bearing, and thus it will be seen that from this construction the movable bearings will be always forced into contact with the journals of the impression-cylinder and will always accommodate themselves and take up the wear of said journals, and that the cylinder may be removed from its bearings with ease and facility.

It is obvious that our bearing may be employed in all classes of machines, as well as in cylinder printing-presses.

Having described our invention, what we claim as new, and desire to secure by Letters Patent, is—

A journal-bearing consisting of the rigid part 2, the movable part 3, and a lever 5, said lever being adapted to adjust the movable part 3 and being rigidly supported at one end, and a spring adapted to support the other end of said lever, substantially as described.

In testimony whereof we affix our signatures in presence of two witnesses.

FRANCIS X. HOOPER.
WILLIAM HOLLINGSWORTH.

Witnesses:
JNO. T. MADDOX,
FLORENCE WYATT.